(12) United States Patent
O'Neil et al.

(10) Patent No.: US 12,450,702 B2
(45) Date of Patent: Oct. 21, 2025

(54) SYSTEM, DEVICES AND/OR PROCESSES FOR APPLICATION OF AN INTENSITY DERIVATIVE FOR TEMPORAL IMAGE STABILITY

(71) Applicant: Arm Limited, Cambridge (GB)

(72) Inventors: Liam James O'Neil, Bedale (GB); Joshua James Sowerby, Twickenham (GB); Yanxiang Wang, Manchester (GB)

(73) Assignee: Arm Limited, Cambridge (GB)

( * ) Notice: Subject to any disclaimer, the term of this patent is extended or adjusted under 35 U.S.C. 154(b) by 117 days.

(21) Appl. No.: 18/480,327

(22) Filed: Oct. 3, 2023

(65) Prior Publication Data

US 2024/0177277 A1    May 30, 2024

(30) Foreign Application Priority Data

Nov. 24, 2022   (GB) ...................... 2217591

(51) Int. Cl.
| | |
|---|---|
| *G06T 5/70* | (2024.01) |
| *G06T 3/18* | (2024.01) |
| *G06T 5/50* | (2006.01) |
| *G06T 7/90* | (2017.01) |

(52) U.S. Cl.
CPC ................. *G06T 5/70* (2024.01); *G06T 3/18* (2024.01); *G06T 5/50* (2013.01); *G06T 7/90* (2017.01); *G06T 2207/10016* (2013.01); *G06T 2207/20084* (2013.01); *G06T 2207/20182* (2013.01)

(58) Field of Classification Search
CPC .... G06T 5/70; G06T 7/90; G06T 5/50; G06T 2207/10016; G06T 2207/20084; G06T 2207/20182
See application file for complete search history.

(56) References Cited

U.S. PATENT DOCUMENTS

| | | | |
|---|---|---|---|
| 11,216,916 B1 | 1/2022 | Kozlowski et al. | |
| 2003/0046673 A1 | 3/2003 | Copeland et al. | |
| 2005/0081184 A1 | 4/2005 | Deedwaniya et al. | |
| 2011/0271290 A1 | 11/2011 | Bodin | |
| 2013/0185704 A1 | 7/2013 | Kuesel et al. | |
| 2015/0130860 A1* | 5/2015 | Park ...................... | G09G 3/3225 345/691 |
| 2016/0019071 A1 | 1/2016 | Webb et al. | |
| 2022/0028037 A1* | 1/2022 | Skaljak .................... | G06T 5/60 |

(Continued)

FOREIGN PATENT DOCUMENTS

WO    2015150970 A1    10/2015

OTHER PUBLICATIONS

Combined Search and Examination Report under Sections 17 and 18(3), App. No. GB2317367.7, Mailed May 3, 2024, 7 pages.

(Continued)

*Primary Examiner* — Kent W Chang
(74) *Attorney, Agent, or Firm* — Berkeley Law & Technology Group, LLP

(57) ABSTRACT

Example methods, apparatuses, and/or articles of manufacture are disclosed that may be implemented, in whole or in part, techniques to apply an image anti-aliasing operation to an image frame. In a particular implementation, an anti-flicker process may be applied to a portion of an image frame based, at least in part, on a rate of change in an intensity in the image frame.

20 Claims, 10 Drawing Sheets

(56) References Cited

U.S. PATENT DOCUMENTS

2022/0385842 A1\* 12/2022 Price .................. H04N 25/46
2023/0146005 A1\* 5/2023 Chernigin ............ G06N 3/0464
                                                                             345/595
2024/0037713 A1\* 2/2024 O'Neil .................. G06T 3/18

OTHER PUBLICATIONS

Response to Combined Search and Examination Report under Sections 17 and 18(3), App. No. GB2217591.3, Filed May 28, 2024, 30 pages.
Intention to Grant under Section 18(4), App. No. GB2217591.3, Mailed Sep. 9, 2024, 2 pages.
Combined Search and Examination Report under Sections 17 and 18(3), App. No. GB2217591.3, Mailed May 18, 2023, 5 pages.
Riley, et al, "Fidelityfx Super Resolution 2.0," https://www.amd.com/en/technologies/fidelityfx-super-resolution, Mar. 2022, 68 pages.
Yang, et al, "A Survey of Temporal Antialiasing Techniques," STAR—State of The Art Report, DOI: 10.1111/cgf.14018, vol. 39 (2020), No. 2, Jul. 13, 2020, 15 pages.

\* cited by examiner

SYSTEM, DEVICES AND/OR PROCESSES FOR APPLICATION OF AN INTENSITY DERIVATIVE FOR TEMPORAL IMAGE STABILITY

This application claims the benefit of priority to U.K. Patent Application Serial No. 2217591.3 titled "SYSTEM, DEVICES AND/OR PROCESSES FOR APPLICATION OF AN INTENSITY DERIVATIVE FOR TEMPORAL IMAGE STABILITY," filed on Nov. 24, 2022, which is incorporated herein by reference in its entirety.

BACKGROUND

1. Field

Techniques, devices and processes for application of an anti-aliasing technique to a rendered image are described.

2. Information

Adaptation of computer-generated imagery to different resolutions (e.g., to small resolutions on mobile gaming platforms) may introduce image aliasing, possibly giving rise to "jaggy" edges in rendered content. Temporal Anti-Aliasing (TAA) processes may be employed to mitigate such aliasing effects by, for example, setting pixel values of averages of sub-pixel samples. Such averages of sub-pixel samples may be determined based, at least in part, on temporal accumulation of such sub-pixel samples.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1A:
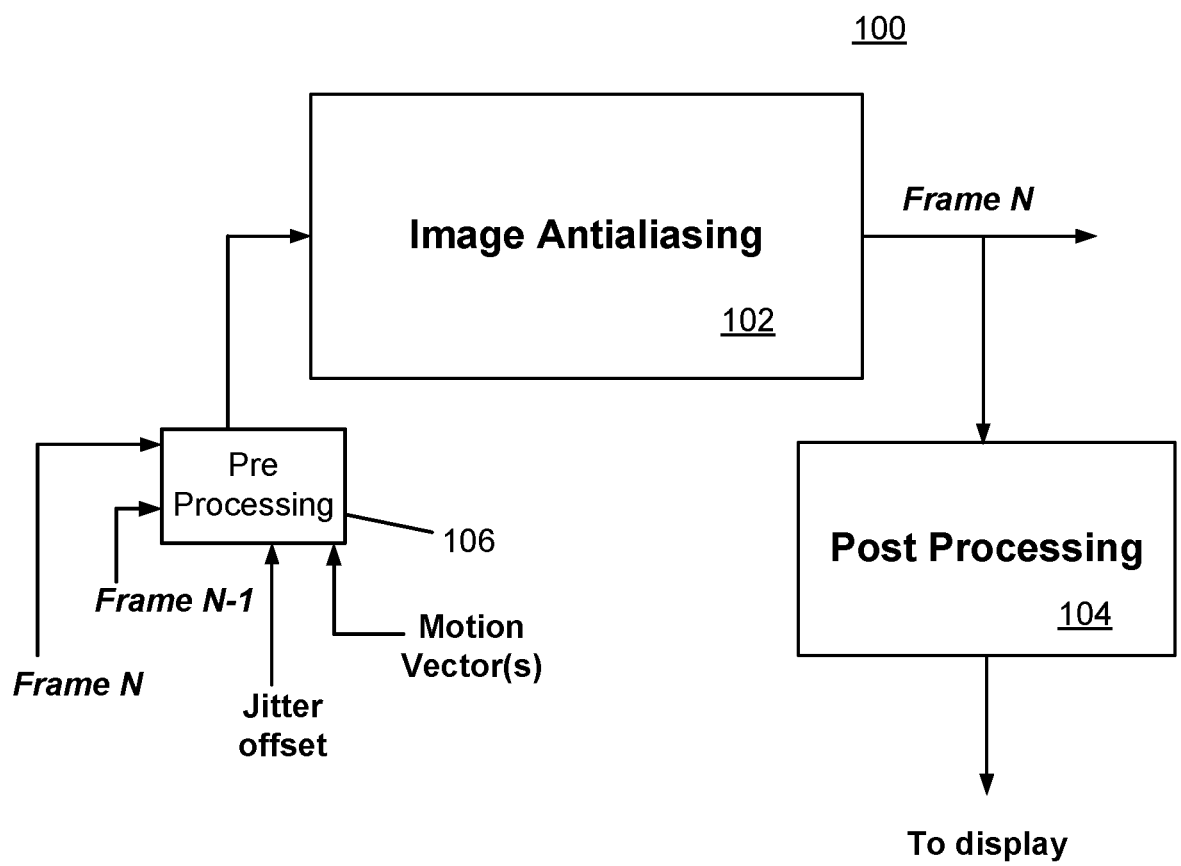
FIG. 1A is a schematic diagram of a system for processing image frames according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

According to an embodiment, Temporal Anti-Aliasing (TAA) techniques may involve processing of image signal intensity values collected over multiple image frames. In an implementation, aliasing may occur if observations and/or samples of an image signal are not obtained at a sufficiently high resolution to avoid distortion and/or artifacts in a reproduced image. To evenly sample different locations within a pixel area, a sub-pixel jitter offset drawn from a sample sequence may be used to shift a viewport temporally on image frames. For example, a viewport sub-pixel jitter offset may be injected to a camera projection matrix to spatially vary different image pixel values in different image frames. Samples temporally accumulated from an output of a previous image frame may be reprojected (e.g., resampled) based, at least in part, on application-generated motion vectors to account for camera and/or object motion. Due to changes in occlusion, lighting and/or surface content, for example, a fetched history of image pixel values (e.g., for a previous image) may be invalid and/or inconsistent with image signal intensity values in a current image frame. Application of such invalid image signal intensity values without scrutiny may introduce ghosting and/or image lag artifacts. In a particular implementation, image signal intensity values identified as being invalid may be rejected or rectified. To generate image signal intensity values for a current frame, current image signal intensity values may be accumulated into a warped rectified history at associated pixel locations.

In an implementation, effectiveness of a TAA algorithm may be determined, at least in part, on an ability of such a TAA algorithm to "rectify" a warped anti-aliased history frame. Such a rectification process may involve identifying whether a disocclusion (or warping error) has occurred during reprojection and, in such instances, selecting an alternate color value, known as "clamping" the history. Such a history clamping may rely on rule-defined algorithms which involve use of graphics buffer information such as motion vectors, surface normal, frame buffer/geometry statistics or computing color and/or depth buffer statistics, and may leverage manually tuned heuristics. While such heuristics may be effective in some applications, such heuristics may fall short in producing sufficient image quality in the absence of locality-derived rules. According to an embodiment, such locality-derived rules may be determined, least in part, by training a deep neural network as employed, for example, by NVIDIA's DLSS neural network architecture.

One particular challenging type of content for TAA to process is high contrast thin edges. Due to jitter between time steps, a TAA process may alternately sample on and off a high contrast edge. While rectifying (e.g., clamping), a TAA process may clamp a history toward an input color sample. If the input color signal is oscillating over time, this may cause the history to be clamped towards the particular input color sample at each time step, causing the oscillation to appear in the output frame as a "flicker" artifact. This temporal instability may significantly degrade perceived image quality.

In lieu of clamping a history, an accumulation of sampled image signal intensity values for a pixel may produce an integral of spatial samples over multiple image frames. Merely accumulating and completely abandoning clamping in areas where there are significant amounts of motion, however, may introduce ghosting (e.g., the history is not clamped to a current input).

Some implementations of a TAA process may accumulate samples with a per-pixel sample contribution that is based on spatial relevance to a target pixel, and an amount of already accumulated information. However, this may fail to take into account a variance of samples over time. One embodiment is directed to computation of a metric to enable distinguishing between a presence of flickering behaviour (e.g., high frequency oscillation) and ghosting (e.g., step changes in value). In one implementation, a process to compute such a metric may occur online to reduce memory and compute overhead, for example (e.g., obviating a need to store a history of image frames to compute the metric). In another implementation, such a metric may be provided as part of an input tensor to a neural network (NN) for use in computing filter coefficients and/or other parameters (e.g., parameters to determine whether to accept or reject a current history). In another implementation, such a metric may be incorporated in variety of graphics and non-graphics use-cases for detection of flicker, and if flicker is detected, apply processing to remove/reduce/mitigate the detected flicker, thereby improving perceptual quality.

Briefly, in one aspect, implementations disclosed herein relate to a computer-implemented method comprising: receiving a temporal sequence of time instances, each time instance comprising one or more samples having at least one value; for a current time instance in the temporal sequence of time instances: computing a signal to be indicative of a rate of change at the current time instance in the at least one value; and generating an accumulated signal value based on the computed signal and an accumulated difference value generated for a previous time instance in the temporal sequence of time instances; and applying the accumulated difference value to correct at least one value in a time instance of the temporal sequence of time instances or an operation to be applied to at least one value in a time instance of the temporal sequence of time instances. In particular implementation in which the sequence of time instance corresponds with a temporal sequence of image frames, such an accumulated difference values may be applied to correct a flickering in a portion of an image to be presented.

In a particular implementation, a rate of change in an intensity of a portion of an image frame may be assessed based, at least in part, on examining the computed derivative of color samples over a duration. If such a computed derivative is high over a duration, indicating a high rate of change, flickering may be more likely to be present. If such a computed derivative is low over a duration, indicating a low rate of change, ghosting may be more likely to be present. To assess how such a computed derivative is to change over time, an average may be computed over a sliding window of image frame frames. This may entail, however, maintaining multiple image frames in memory and computing operations over all of the stored image frames, which may be computationally costly for a memory-constrained computing environment such as a mobile device.

In a particular implementation, a rate of change in a derivative may be assessed based, at least in part, on an accumulation of the derivative at image frame intervals to be stored/updated in a buffer using an alpha blend, for example. Such an alpha blend, which may be implemented as an exponential smoothing filter, may blend a current derivative into an accumulated value in a buffer, which may be a result of accumulation of multiple previous blend steps. One rationale behind such an alpha blend is that if a rate of change of a derivative is high, high values may be continuously blended into the accumulated value stored in the buffer, causing the stored value to rise. Likewise, if a rate of change of a derivative is low, low values may be continuously blended into the accumulated value stored in the buffer, causing the stored values to decrease and/or maintain a low level. Such an accumulated value may then enable detection of a presence of flickering in the input color samples.

FIG. 1A is a schematic diagram of a system 100 for processing image frames according to an embodiment in which an anti-aliasing component 102 may determine image signal intensity values associated with pixel locations in an image frame Frame N. According to an embodiment, features of system 100 may be integrated with an electronic device capable of displaying and/or reproducing visual images such as a device capable of generating signals in a particular format to drive a display device. Such a device may comprise, for example, a mobile phone and/or other specialized computing device applicable for gaming, etc.

As shown, anti-aliasing component 102 may determine image signal intensity values of image frame Frame N based, at least in part, on image signal intensity values of frame Frame N−1 and a jitter offset signal and motion vectors. Block 104 may further process image signal intensity values of image frame Frame N for presentation on a display device (e.g., according to a particular image presentation format). Image signal intensity values of a subsequent frame Frame N+1 (not shown) may also be generated based, at least in part, on image signal intensity values of Frame N.

Figure 1B:
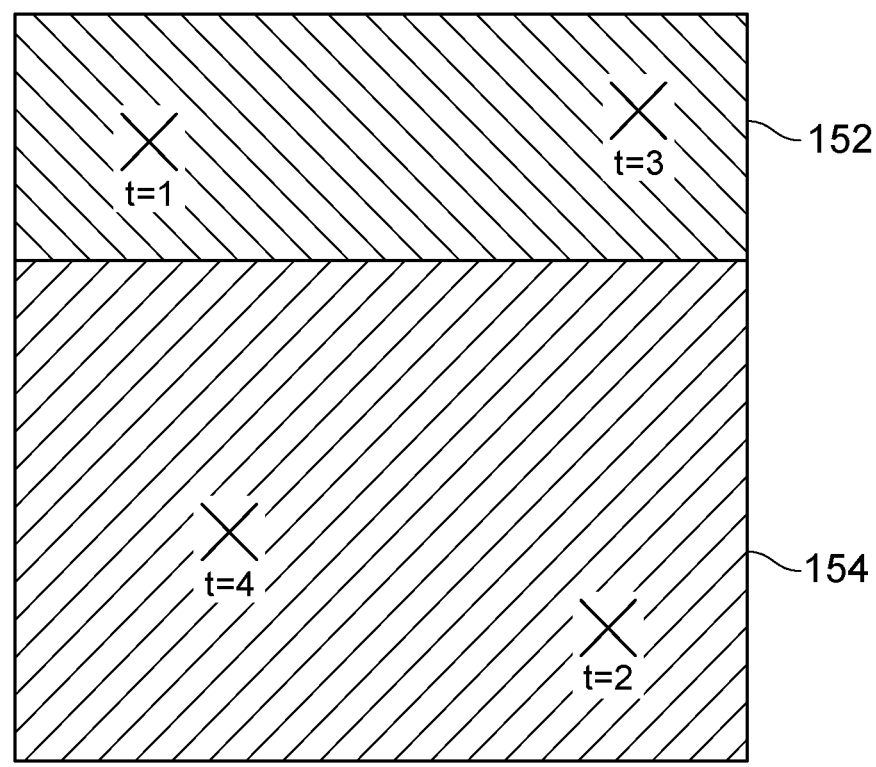
FIG. 1B is an illustration of a portion of an image frame having a high-frequency edge, according to an embodiment.

FIG. 1B is an illustration of a portion of an image frame having a high-frequency edge, according to an embodiment. As pointed out above, jitter may introduce challenges for TAA processing for high contrast, thin edges. Between time steps in the presence of such jitter, a TAA process may alternately sample on/off a high contrast edge such as in region 150. In the particular example of FIG. 1B, a sample at time t=1 in region 152 of a first color is sampled while a sample at time t=2 in region 154 of a second, contrasting, color is sampled. A sample at time t=3 in region 152 of the first color is again sampled while a sample at time t=4 in region 154 of the second color is again sampled. Obtaining such samples in the sequency t=1,2,3 and 4 may result in an oscillation between contrasting extremes giving rise to flicker.

Figure 2A:
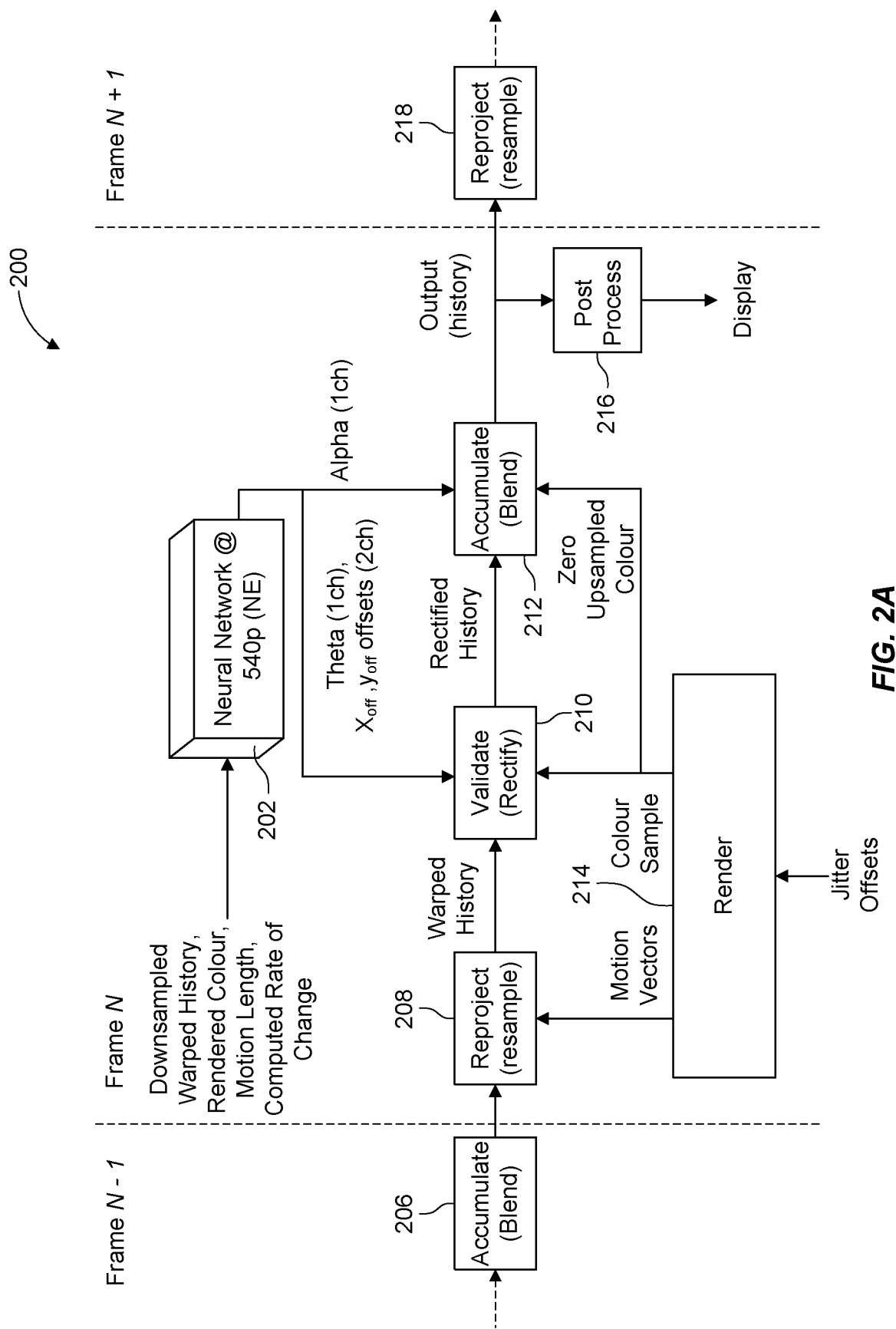
FIG. 2A is a schematic diagram of an implementation of a system for applying an image anti-aliasing operation to an image frame, according to an embodiment.

In the particular implementation of FIG. 2A, image signal intensity values of a frame Frame N−1 may be warped at reproject operation 208 based, at least in part, on motion vectors and/or optical flow supplied from render operation 214. To reduce and/or eliminate ghosting and/or image lag artifacts, validate operation 210 may identify portions of a warped frame produced by reproject operation 208 as being invalid (e.g., to be rejected or rectified). A rectified warped frame produced by validate operation may then be blended and/or combined at accumulate operation 212 with one or more frames generated by render operation 214 to provide a blended image frame. A blended image frame produced by accumulate operation 212 may then be post-processed at operation 216 for display on a display device (not shown).

According to an embodiment, parameters to be applied in validation operation 210 and/or accumulate operation 212 may be determined as output values provided by neural network (NN) 202 such output values to be based, at least in part, on warped image frames computed at reproject operation 208, for example. In a particular implementation, NN 202 may define multiple output channels to provide, for example, a per pixel value alpha to be applied by accumulate operation 212 in generating a blended image frame, and a per pixel value theta and a kernel offset values to be applied by validate operation 210.

According to an embodiment, warped image frames provided in an input tensor to NN 202 may be derived, at least in part, from warped image frames provided by reproject operation 208. An input tensor to NN 202 may comprise a warped image frame, a length of a motion vector(s) and/or color sample (e.g., from render operation 214), just to provide a few examples. In a particular implementation, warped image frames provided in an input tensor to NN 202 may comprise downsampled versions of warped image frames provided by reproject operation 208. Likewise, parameters provided in an output tensor of NN 202 may be upsampled to a higher resolution for application to higher resolution image frames at operations 210 and 212. Such a downsampling of a warped image frame in an input tensor and upsampling of parameters in an output tensor to be applied in antialiasing operations may enable a decoupling of NN 202 from any specific size of image frame, and further enable a reduction in scale of NN 202 without significant loss in image quality. As pointed out above, input values received by NN 202 may be based on warped image frames computed by Frame N−1 accumulate operation 206. In a particular implementation, a scaling of input values received by NN 202 may be different from and/or decoupled from a scaling of warped image frames produced by reproject operation 208. For example, while reproject operation 208 may provide image signal intensity values of pixels of an image frame having 1920×1080 pixels, inputs received at NN 202 may comprise a downscaled image frame having image signal intensity values (e.g., for a 960×540 pixel image frame). As such, the particular NN model of NN 202 may be independent of a particular resolution of image frames being processed to address image aliasing, allowing a set implementation of NN 202 to be applied to anti-aliasing operations applied to image frames of a different pixel resolution.

In another particular implementation, an input tensor received at NN 202 may include a computed metric that is indicative of a rate of change in an intensity of at least a portion of an image frame (e.g., particular pixel location(s) over multiple image frames in a history of image frames). As pointed out above, render operation 214 may provide an image frame at a first pixel resolution while NN 202 may receive image frames as part of an input tensor at a second pixel resolution that is lower than the first pixel resolution. In one implementation, validate operation 210 and/or accumulate operation 212 may be executed at the first pixel resolution (of the image frame provided by render operation 214). In another implementation, a reprojected output image frame provided to post processing 216 and reprojection operation 218 is to be upscaled to have a pixel resolution higher than the first pixel resolution. To enable providing such an output image frame at a pixel resolution higher than the first pixel resolution, parameters provided by NN 202 to validate operation 210 and/or accumulate operation 212 may be appropriately upscaled to the higher resolution.

Figure 2B:
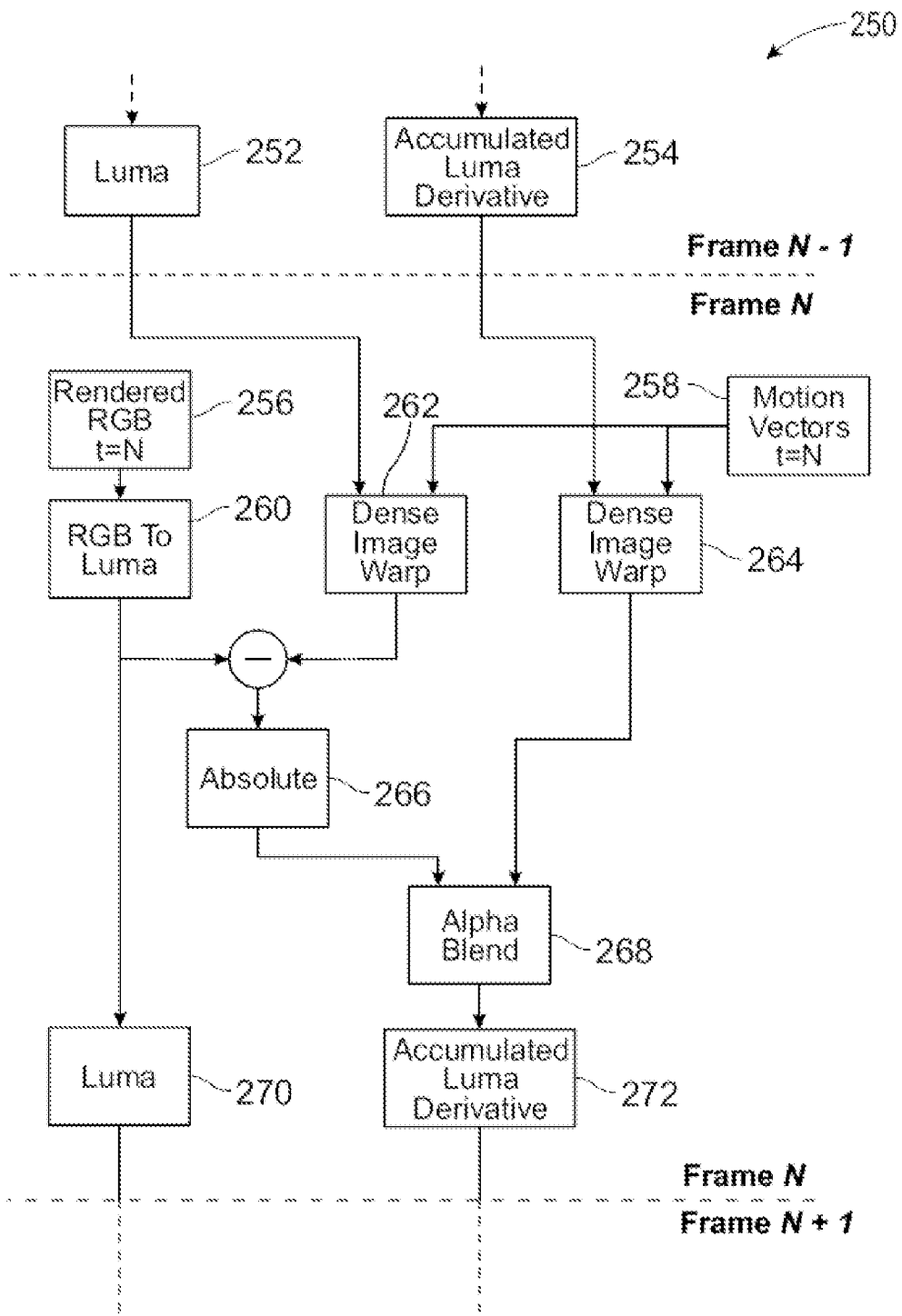
FIGS. 2B and 2C are schematic diagrams of implementations of operations to compute a greyscale derivative for a portion of an image frame, according to embodiments.
Figure 2C:
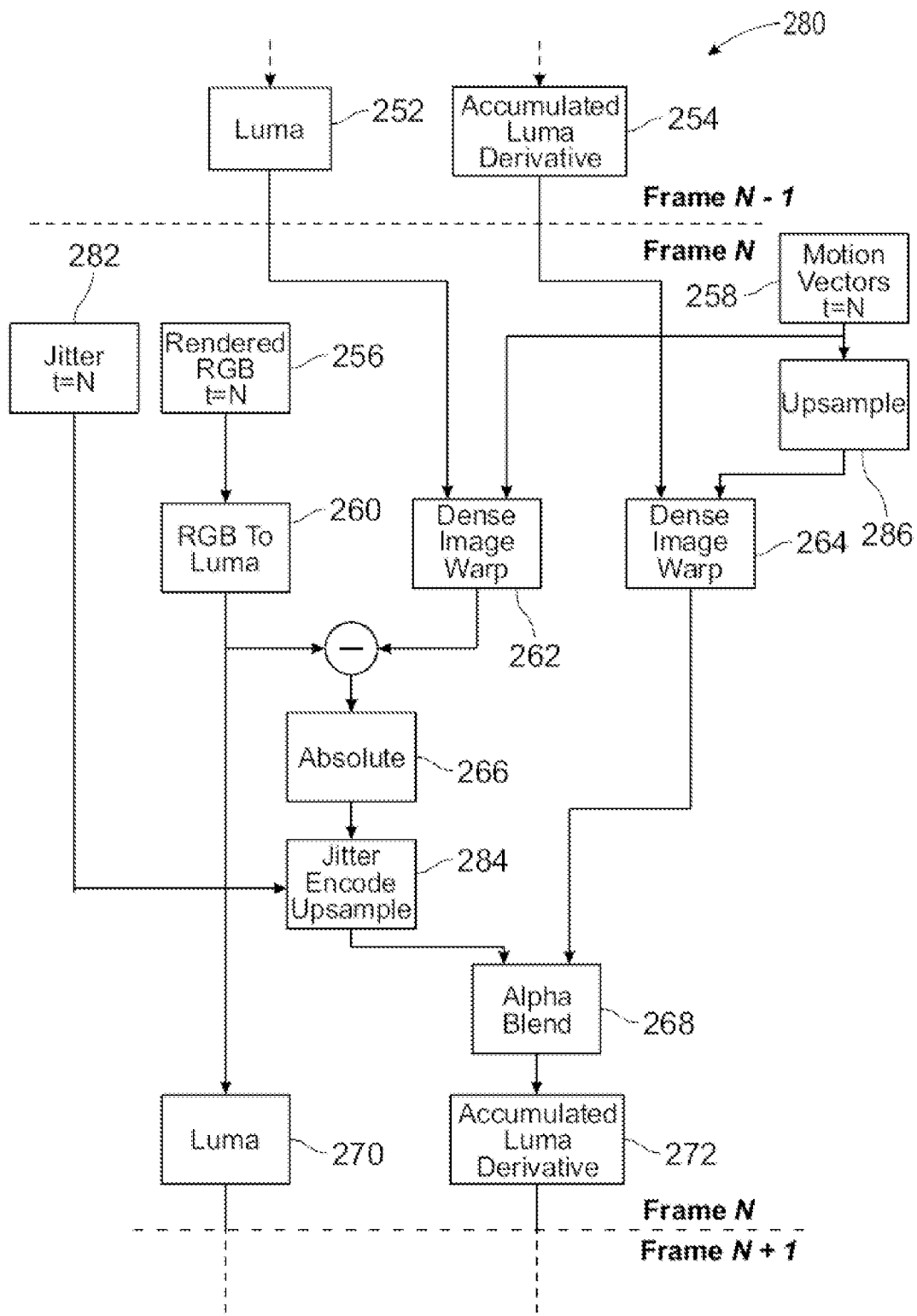

According to an embodiment, an indicator of a rate of change in an intensity of an image may be computed as an accumulated derivative of a greyscale value at particular locations (e.g., pixel locations) in an image frame. In this context, a "greyscale value" as referred to herein is to mean a single-dimension magnitude value to represent an intensity (e.g., an intensity or light and/or brightness) to be associated with a location or region (e.g., pixel) in an image frame. Such a greyscale value may be expressed, for example, as a single floating point or integer expression. In particular example implementations of FIGS. 2B and 2C, such a greyscale value may be computed as a luma value and an indicator of a rate of change in an intensity of an image may be computed based on an accumulated derivative of the computed luma value. In other implementations, such a greyscale value may be computed differently (e.g., as a luminance value) and an accumulated derivative of a greyscale value may be computed as an accumulated derivative of the differently computed greyscale value (e.g., as an accumulated derivative of a luminance value). As shown in FIG. 2B, system 250 may compute an updated accumulated derivative of luma 272 at Frame N based, at least in part, on an accumulated derivative of a computed luma 254 at Frame N−1. Image signal intensity values 256 for particular pixel location(s) at Frame N may be generated by render operation 214, for example. In one particular implementation in which image signal intensity values 256 are provided in a red, green, blue (RGB) format, block 260 may compute a luma value L based, at least in part, on image signal intensity values according to expression (1) as follows:

$$L=0.25 \times R+0.5 \times G+0.25 \times B, \qquad (1)$$

where R, G, B are image signal intensity values of a pixel location in Frame N for red, green and blue color channels, respectively.

In other implementations, block 260 may compute a luma value using other, different techniques such as according to models set forth in ITU-R Recommendation BT.709 or BT.2000, just to provide a couple of additional examples. As pointed out above, it should be understood that computation of a luma value (e.g., as shown in expression (1)) is merely an example of how a greyscale value may be computed, and that other techniques (e.g., mapping multiple intensity values to a single-dimension magnitude value) may be used to compute a greyscale value without deviating from claimed subject matter.

To better temporally align luma value 252 and accumulated luma derivative 254 determined for Frame N at block 256 and a luma value determined at block 260, dense image warp operations may be applied at blocks 262 and 264 based, at least in part, on motion vectors 258 (e.g., computed by render operation 214). In a particular implementation, blocks 262 and 264 may apply a dense image warp operation to compute a warp value output out(x,y) at a pixel location x, y (e.g., for a greyscale value such as luma value 252 and/or accumulated greyscale derivative value such as accumulated luma derivative 254) according to expression (2) as follows:

$$\text{out}(x, y) = \text{in}(x+u(x, y), y+v(x, y)), \quad (2)$$

where:
in(x,y) denotes input value(s) of luma or accumulated luma derivative for a pixel location x, y of Frame N−1; and
u and v denote horizontal and vertical displacements between frames Frame N−1 and Frame N.

According to an embodiment, an absolute value $L_d(x, y)$ at block 266 may be computed as a combination of a luma value determined for Frame N at block 260 and warped luma value determined at block 262 according to expression (3) as follows:

$$L_d(x, y) = |L_t(x, y) - L_{t_{m1}}(x, y)|, \quad (3)$$

where:
$L_t(x, y)$ is a luma value in Frame N for pixel location x, y; and
$L_{t_{m1}}(x, y)$ is a luma value warped from Frame N−1 to Frame N at block 262 for pixel location x, y.

According to an embodiment, block 268 may determine an accumulated luma derivative $L_{d_{accum}}(x, y)$ (block 272) for Frame N at location x, y according to expression (4) as follows:

$$L_{d_{accum}}(x, y) = \text{alpha}(x, y) \times L_d(x, y) + [(1-\text{alpha}(x, y)) \times L_{d_{accum}warp}(x, y)], \quad (4)$$

where:
alpha(x, y) is a tunable blending coefficient that is determined holistically; and
$L_{d_{accum}warp}(x, y)$ is an accumulated luma derivative 254 at pixel location x, y computed for Frame N−1 warped to Frame N at block 264.

As pointed out above, render operation 214 may generate an image frame at one resolution (e.g., 540×960 pixels) while a final output image may be provided to post processing 216 for display at a higher resolution (e.g., 1080×1920 pixels). According to an embodiment, system 250 may be modified to provide system 280 (FIG. 2C) where motion vectors 258 may be upsampled at block 286 to provide higher resolution motion vectors to be applied at dense image warp operation at block 264. Likewise, an absolute value $L_d(x, y)$ at block 266 may be upsampled at block 284 based, at least in part, on jitter signal 282 (e.g., generated by render operation 214) to provide an upsampling of absolute value $L_d(x, y)$ to be combined at block 268.

Figure 3A:
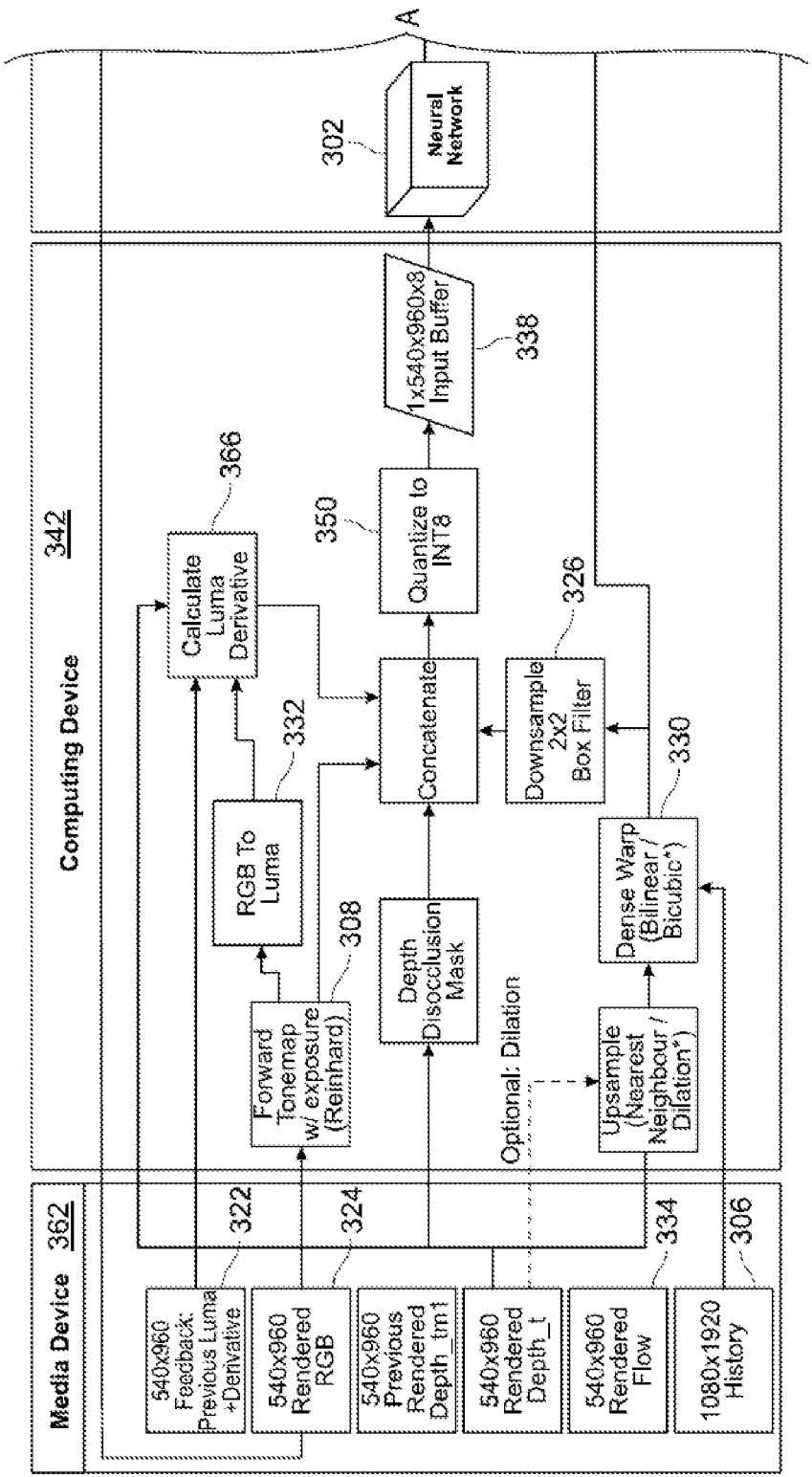
FIGS. 3A and 3B are a schematic diagram of an implementation of a system for applying image anti-aliasing operations to an image frame, according to embodiments.
Figure 3B:
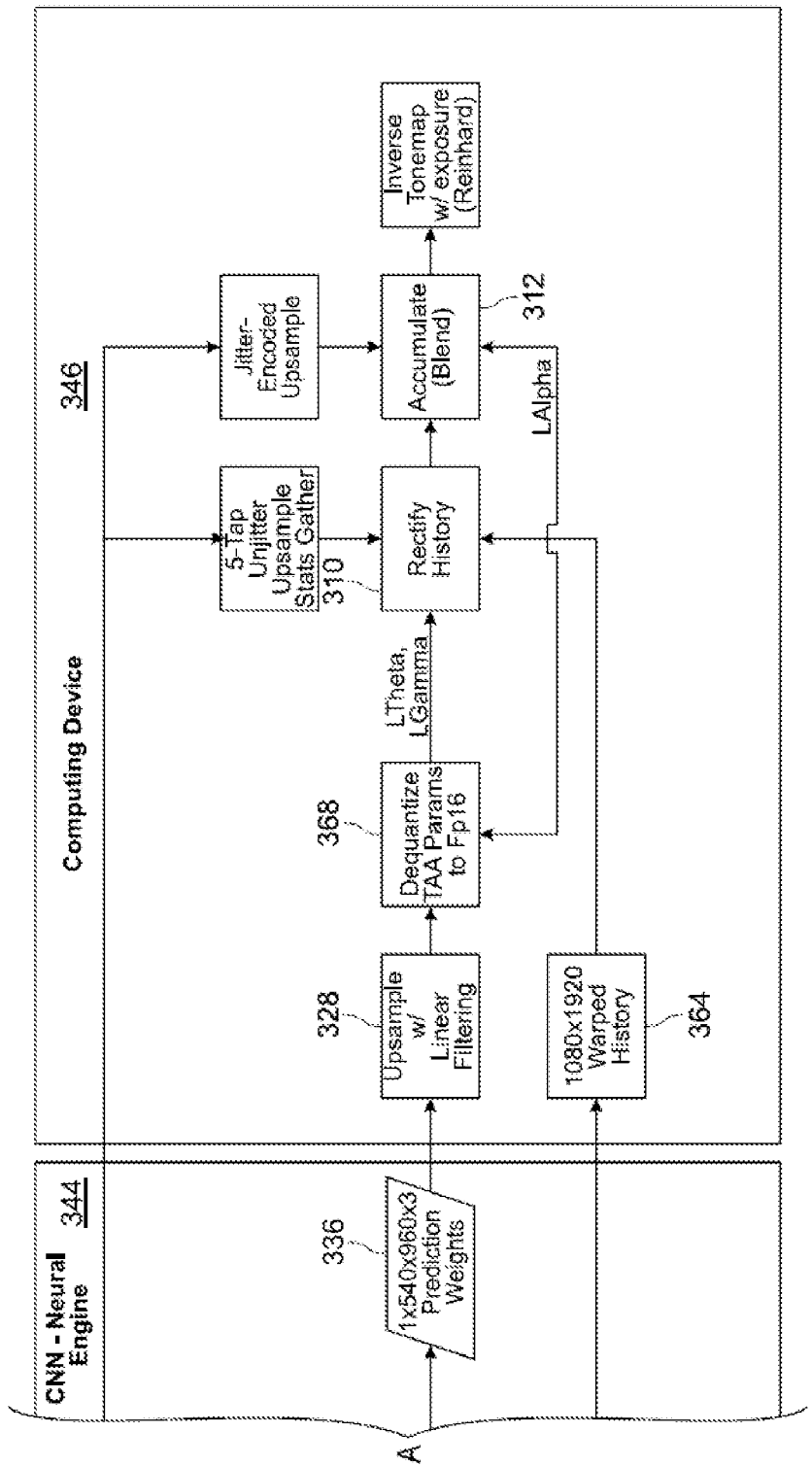

FIGS. 3A and 3B are a schematic diagram of a pipeline implementation of a system 300 for executing image antialiasing operations to an image frame, according to embodiments. In a particular implementation, system 300 may comprise one or more computing devices formed on one or more integrated circuit (IC) dies such as one or more IC dies implementing computing devices 342 and 346, and media device 362. Media device 362 may comprise any one of several types of devices capable of processing and presenting content (e.g., audio content and/or image content) to an end user such as gaming device or mobile entertainment device. System 300 may further integrate computing devices 342 and 346 with a NN device 344 formed on and/or executed by a separate IC die, for example. System 300 may implement one or more features of system 200 (FIG. 2A). For example, NN 302 may at least in part implement NN 202 by computing an output tensor 336 comprising parameters to be applied in one or more image anti-aliasing operations based, at least in part, on an input tensor provided in an input buffer 338 based, at least in part, on a warped image frame 330. NN 302 may be configured to execute a convolutional NN, for example.

According to an embodiment, media device 362 may generate image signal intensity values of a current image frame 324 in a rendering operation such as render operation 214. Block 332 may compute luma values for individual pixel locations in rendered image frame 324 such as by operation 260 and expression (1), for example. Block 366 may compute an accumulated luma derivative, such as an accumulated luma derivative 272, for pixel locations in rendered image frame 324 based, at least in part, on luma values computed at block 332 and accumulated luma derivative values computed in a previous image frame provided at block 322. Block 366 may compute such an accumulated luma derivative according to block 268 and/or expression (4), for example. Values for an accumulated luma derivative computed for pixel locations at block 366 may be concatenated with other parameters (e.g., image signal intensity values derived from 334) to form an input tensor to be loaded to buffer 338.

As pointed out above, NN 302 may be configured to process image frames and related parameters at a resolution (e.g., 540×960 pixels) lower than a resolution of a warped image frame (e.g., 1080×1920 pixels) based, at least in part, on an image frame determined for a previous time instance and computed motion vectors. While warped image frame 330 may express an image one particular pixel resolution (e.g., 1080×1920 pixels), downsample operation 326 may generate a warped image frame to express the image frame in a lower pixel resolution (e.g., 540×960 pixels) to be combined in an input tensor to be loaded to buffer 338. Elements of such an input tensor may be quantized at quantization 350 according to an input quantization. Additionally, parameters in an output tensor loaded to buffer 336 may be upscaled to a higher resolution (e.g., from 540×960 pixels to 1080×1920 pixels) for application to rectify operation 310 and blend operation 312.

According to an embodiment, NN 302 may compute parameters of an output tensor to be stored in a buffer 336 based, at least in part, on parameters of an input tensor stored in buffer 338. Parameters of such an output tensor stored in buffer 336 may comprise parameters to be applied in antialiasing operations of computing device portion 346 (e.g., rectify operation 310 and blend operation 312). In a particular implementation, such parameters of an output tensor stored in buffer 336 may be upsampled at upsample operation 328 to provide parameters scaled according to a resolution that matches a resolution of a warped image frame, for example. As pointed out above, executing NN 302 to provide parameters to be applied to an image frame at a pixel resolution lower than a resolution of warped image frame at warped history 364 may enable a smaller scale, less costly design for NN 302 that does not significantly degrade image quality.

Figure 4:
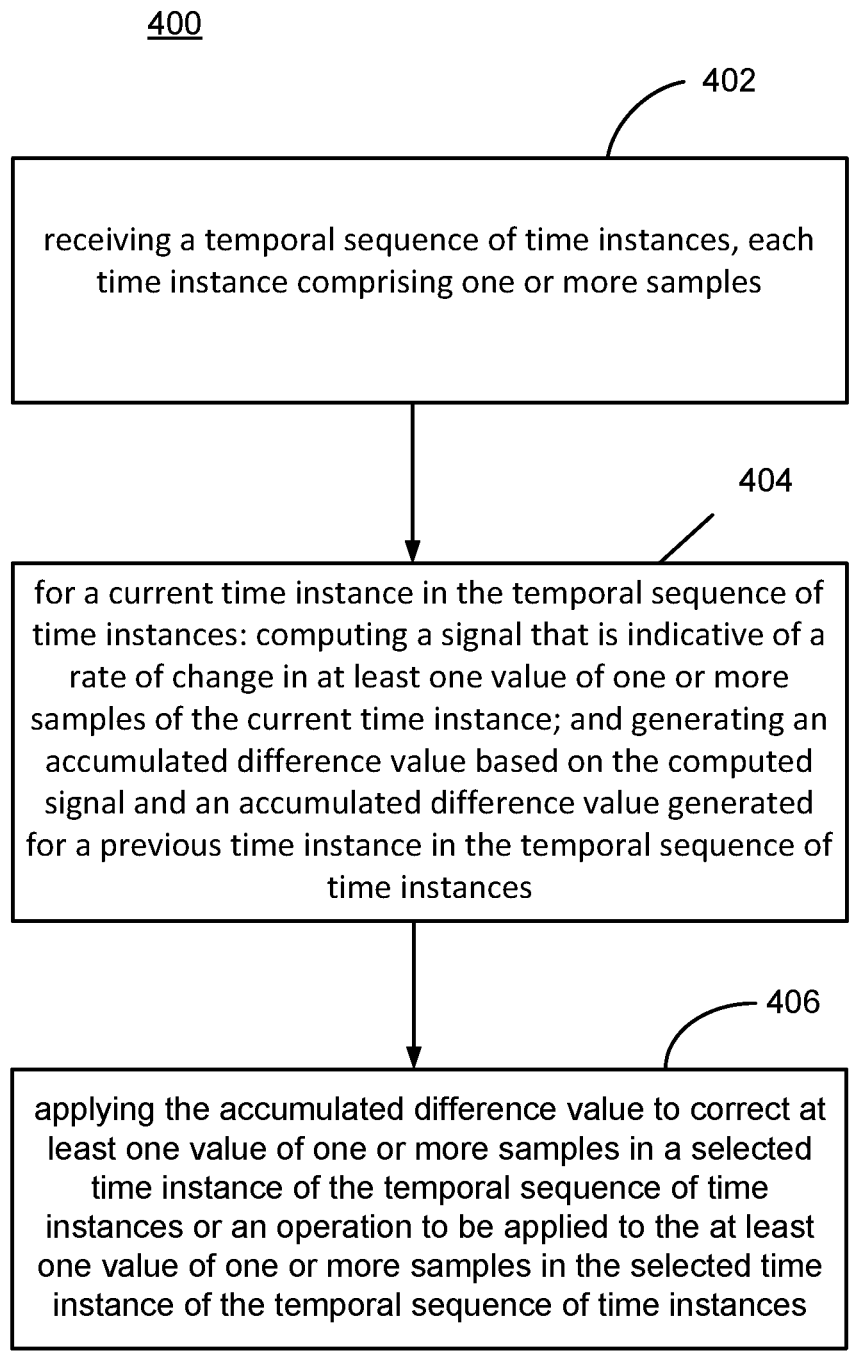
FIG. 4 is a flow diagram of a process to determine a correction to at least one value in a time instance, according to an embodiment.

FIG. 4 is a flow diagram of a computer-implemented process 400 to process a temporal sequence of time instances. Such a time instance of a temporal sequence time instances received at block 402 may comprise one or more signals and/or samples that are quantifiable to a value. According to an embodiment, a temporal sequence of instances received at block 402 may comprise a temporal sequence of image frames to be processed by system 200. For example, an instance of a temporal sequence of time instances received at block 402 may comprise an image frame received at reproject operation 208 from accumulate operation 206 (e.g., executed in a preceding instance).

Block 404 may comprise updating and/or maintaining an accumulated difference value for at least one value in a temporal sequence of time instances. For example, block 404 may comprise computing a signal to be indicative of a rate of change at a pixel location in a temporal sequence of image frames by computing a difference in a computed luma value at the pixel location according to block 272 and/or expressions (2) and (3). It should be understood, however, that computation of such a difference in a computed luma value is merely an example of how a signal indicative of a rate of change in a value of one or more signals of a time instance may be computed, and that claimed subject matter is not limited in this respect. For example, block 404 may instead compute a value indicative of a rate of change in a luma value and/or other attribute associated with a pixel location in a temporal sequence of image frames.

According to an embodiment, block 404 may compute a signal to be indicative of the rate of change in at least one value by processing at least one sample generated for a previous time instance to provide an extrapolation of the at least one sample generated for the previous time instance (e.g., at operation 262); and computing a difference between the extrapolation of the at least one sample generated for the previous time instance and at least one sample generated for the current time instance.

Block 404 may further comprise computation of an accumulated difference value based on a computed signal indicative of a rate of change such as, for example, an accumulated difference for a previous image frame and a computed signal indicative of a rate of change (such as a computed rate of change at a pixel location in a current image frame of a temporal sequence of image frames). Such an accumulated difference value may be computed by operation 272 according to expression (4), for example. In an embodiment, block 404 may compute an accumulated difference value for a current time instance based, at least in part, on an extrapolation of an accumulated difference value (e.g., extrapolated by warping at operation 208 and/or operation 264) generated for a previous time instance. Such an extrapolated accumulated difference value generated from the previous time instance may then be combined with a difference value computed for the current time instance (e.g., at operation 268). According to an embodiment, such an extrapolated accumulated difference value may be computed by warping an accumulated difference value generated from a previous time instance based, at least in part, on an optical flow and/or a motion vector.

It may be appreciated that computation of an updated accumulated difference value (e.g., an updated accumulated luma derivative 272 based on accumulated luma derivative 254 computed for a previous image frame) may obviate an otherwise need to maintain an extensive history of signals for a temporal sequence of time instances. For a temporal sequence of image frames, for example, updating an accumulated difference value (e.g., accumulated luma derivative) at block 404 may enable a reduction in usage of limited memory resources for a graphics buffer (e.g., in a mobile device).

Block 406 may comprise application of an accumulated difference value computed at block 404 to correct one or more aspects of a time instance in the temporal sequence of time instances received at block 402. For example, such an accumulated difference may be applied to an image frame to mitigate and/or remove artifacts such as image flicker. In a particular implementation, block 406 may comprise applying coefficients determined based on an output tensor of a neural network (e.g., NN 202) to image signal intensity values of a warped history of the temporal sequence of frames at validate operation 210 and/or accumulate operation 212 to provide an output image frame (wherein the output tensor is determined based, at least in part, on an accumulated difference value computed at block 404).

According to an embodiment system 200, 250, 280 and/or system 300 may be formed by and/or expressed in transistors and/or lower metal interconnects (not shown) in processes (e.g., front end-of-line and/or back-end-of-line processes) such as processes to form complementary metal oxide semiconductor (CMOS) circuitry, just as an example. It should be understood, however that this is merely an example of how circuitry may be formed in a device in a front end-of-line process, and claimed subject matter is not limited in this respect.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Storage media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

If received within a computer system via one or more machine-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process (e.g., wafer fabrication process).

In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

For one or more embodiments, systems 200 and 300 may be implemented in a device, such as a computing device and/or networking device, that may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IOT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

In the context of the present patent application, the term "connection," the term "component" and/or similar terms are intended to be physical but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, in the context of the present patent application, the term "parameters" (e.g., one or more parameters), "values" (e.g., one or more values), "symbols" (e.g., one or more symbols) "bits" (e.g., one or more bits), "elements" (e.g., one or more elements), "characters" (e.g., one or more characters), "numbers" (e.g., one or more numbers), "numerals" (e.g., one or more numerals) or "measurements" (e.g., one or more measurements) refer to material descriptive of a collection of signals, such as in one or more electronic documents and/or electronic files, and exist in the form of physical signals and/or physical states, such as memory states. For example, one or more parameters, values, symbols, bits, elements, characters, numbers, numerals or measurements, such as referring to one or more aspects of an electronic document and/or an electronic file comprising an image, may include, as examples, time of day at which an image was captured, latitude and longitude of an image capture device, such as a camera, for example, etc. In another example, one or more parameters, values, symbols, bits, elements, characters, numbers, numerals or measurements, relevant to digital content, such as digital content comprising a technical article, as an example, may include one or more authors, for example. Claimed subject matter is intended to embrace meaningful, descriptive parameters, values, symbols, bits, elements, characters, numbers, numerals or measurements in any format, so long as the one or more parameters, values, symbols, bits, elements, characters, numbers, numerals or measurements comprise physical signals and/or states, which may include, as parameter, value, symbol bits, elements, characters, numbers, numerals or measurements examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public. According to an embodiment, a signal packet and/or frame may comprise all or a portion of a "message" transmitted between devices. In an implementation, a message may comprise signals and/or states expressing content to be delivered to a recipient device. For example, a message may at least in part comprise a physical signal in a transmission medium that is modulated by content that is to be stored in a non-transitory storage medium at a recipient device, and subsequently processed.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

Figure 5:
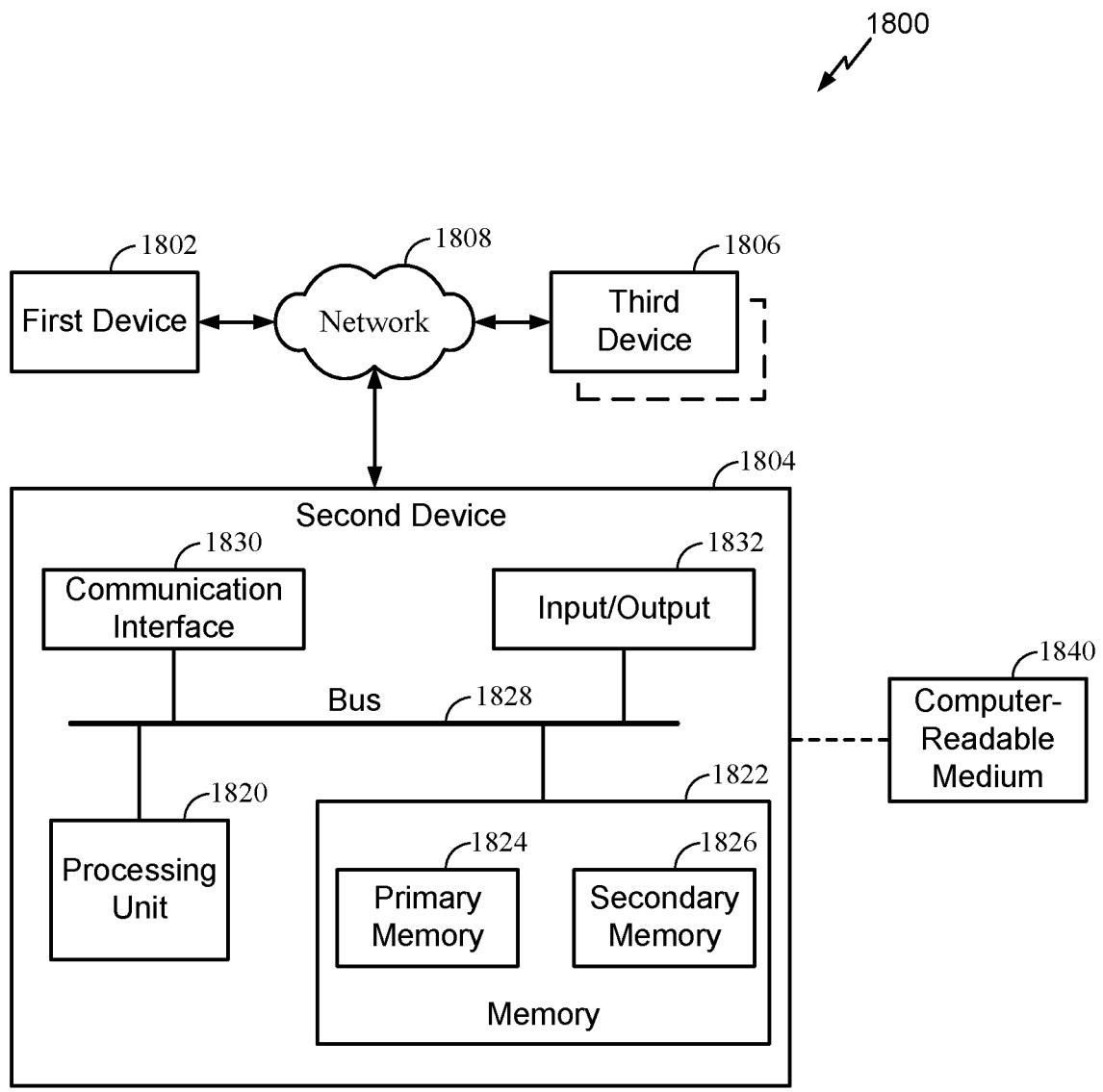
FIG. 5 an example computing system in accordance with an implementation.

FIG. 5 shows an embodiment 1800 of a system that may be employed to implement either type or both types of networks. Network 1808 may comprise one or more network connections, links, processes, services, applications, and/or resources to facilitate and/or support communications, such as an exchange of communication signals, for example, between a computing device, such as 1802, and another computing device, such as 1806, which may, for example, comprise one or more client computing devices and/or one or more server computing device. By way of example, but not limitation, network 1808 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 5 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor" and/or "processing circuit" for example, is understood to connote a specific structure such as a central processing unit (CPU), digital signal processor (DSP), graphics processing unit (GPU) and/or neural network processing unit (NPU), or a combination thereof, of a computing device which may include a control unit and an execution unit. In an aspect, a processor and/or processing circuit may comprise a device that fetches, interprets and executes instructions to process input signals to provide output signals. As such, in the context of the present patent application at least, this is understood to refer to sufficient structure within the meaning of 35 USC § 112 (f) so that it is specifically intended that USC § 112 (f) not be implicated by use of the term "computing device," "processor," "processing unit," "processing circuit" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 2A, 2B, 2C, 3A, 3B and 4 and in the text associated with the foregoing figure(s) of the present patent application.

Referring now to FIG. 5, in an embodiment, first and third devices 1802 and 1806 may be capable of rendering a graphical user interface (GUI) for a network device and/or a computing device, for example, so that a user-operator may engage in system use. Device 1804 may potentially serve a similar function in this illustration. Likewise, in FIG. 5, computing device 1802 ('first device' in figure) may interface with computing device 1804 ('second device' in figure), which may, for example, also comprise features of a client computing device and/or a server computing device, in an embodiment. Processor (e.g., processing device) 1820 and memory 1822, which may comprise primary memory 1824 and secondary memory 1826, may communicate by way of a communication bus 1815, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 1804, as depicted in FIG. 9, is merely one example, and claimed subject matter is not limited in scope to this particular example. FIG. 5 may further comprise a communication interface 1830 which may comprise circuitry and/or devices to facilitate transmission of messages between second device 1804 and first device 1802 and/or third device 1806 in a physical transmission medium over network 1808 using one or more network communication techniques identified herein, for example. In a particular implementation, communication interface 1830 may comprise a transmitter device including devices and/or circuitry to modulate a physical signal in physical transmission medium according to a particular communication format based, at least in part, on a message that is intended for receipt by one or more recipient devices. Similarly, communication interface 1830 may comprise a receiver device comprising devices and/or circuitry demodulate a physical signal in a physical transmission medium to, at least in part, recover at least a portion of a message used to modulate the physical signal according to a particular communication format. In a particular implementation, communication interface may comprise a transceiver device having circuitry to implement a receiver device and transmitter device.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, GNSS receiver and/or other location-identifying type capability, and/or a display with a higher degree of functionality, such as a touch-sensitive color 5D or 3D display, for example.

In FIG. 5, computing device 1802 may provide one or more sources of executable computer instructions in the form physical states and/or signals (e.g., stored in memory states), for example. Computing device 1802 may communicate with computing device 1804 by way of a network connection, such as via network 1808, for example. As previously mentioned, a connection, while physical, may not necessarily be tangible. Although computing device 1804 of FIG. 5 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1822 may comprise any non-transitory storage mechanism. Memory 1822 may comprise, for example, primary memory 1824 and secondary memory 1826, additional memory circuits, mechanisms, or combinations thereof may be used. Memory 1822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1822 may be utilized to store a program of executable computer instructions. For example, processor 1820 may fetch executable instructions from memory and proceed to execute the fetched instructions. Memory 1822 may also comprise a memory controller for accessing device readable-medium 1840 that may carry and/or make accessible digital content, which may include code, and/or instructions, for example, executable by processor 1820 and/or some other device, such as a controller, as one example, capable of executing computer instructions, for example. Under direction of processor 1820, a non-transitory memory, such as memory cells storing physical states (e.g., memory states), comprising, for example, a program of executable computer instructions, may be executed by processor 1820 and able to generate signals to be communicated via a network, for example, as previously described. Generated signals may also be stored in memory, also previously suggested.

Memory 1822 may store electronic files and/or electronic documents, such as relating to one or more users, and may also comprise a computer-readable medium that may carry and/or make accessible content, including code and/or instructions, for example, executable by processor 1820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, samples, observations, weights, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 5, processor 1820 may comprise one or more circuits, such as digital circuits, to perform at least a portion of a computing procedure and/or process. By way of example, but not limitation, processor 1820 may comprise one or more processors, such as controllers, microprocessors, microcontrollers, application specific integrated circuits, digital signal processors (DSPs), graphics processing units (GPUs), neural network processing units (NPUs), programmable logic devices, field programmable gate arrays, the like, or any combination thereof. In various implementations and/or embodiments, processor 1820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 5 also illustrates device 1804 as including a component 1832 operable with input/output devices, for example, so that signals and/or states may be appropriately communicated between devices, such as device 1804 and an input device and/or device 1804 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

According to an embodiment, a neural network may comprise a graph comprising nodes to model neurons in a brain. In this context, a "neural network" as referred to herein means an architecture of a processing device defined and/or represented by a graph including nodes to represent neurons that process input signals to generate output signals, and edges connecting the nodes to represent input and/or output signal paths between and/or among neurons represented by the graph. In particular implementations, a neural network may comprise a biological neural network, made up of real biological neurons, or an artificial neural network, made up of artificial neurons, for solving artificial intelligence (AI) problems, for example. In an implementation, such an artificial neural network may be implemented by one or more computing devices such as computing devices including a central processing unit (CPU), graphics processing unit (GPU), digital signal processing (DSP) unit and/or neural processing unit (NPU), just to provide a few examples. In a particular implementation, neural network weights associated with edges to represent input and/or output paths may reflect gains to be applied and/or whether an associated connection between connected nodes is to be excitatory (e.g., weight with a positive value) or inhibitory connections (e.g., weight with negative value). In an example implementation, a neuron may apply a neural network weight to input signals, and sum weighted input signals to generate a linear combination.

According to an embodiment, edges in a neural network connecting nodes may model synapses capable of transmitting signals (e.g., represented by real number values) between neurons. Responsive to receipt of such a signal, a node/neural may perform some computation to generate an output signal (e.g., to be provided to another node in the neural network connected by an edge). Such an output signal may be based, at least in part, on one or more weights and/or numerical coefficients associated with the node and/or edges providing the output signal. For example, such a weight may increase or decrease a strength of an output signal. In a particular implementation, such weights and/or numerical coefficients may be adjusted and/or updated as a machine learning process progresses. In an implementation, transmission of an output signal from a node in a neural network may be inhibited if a strength of the output signal does not exceed a threshold value.

Figure 6:
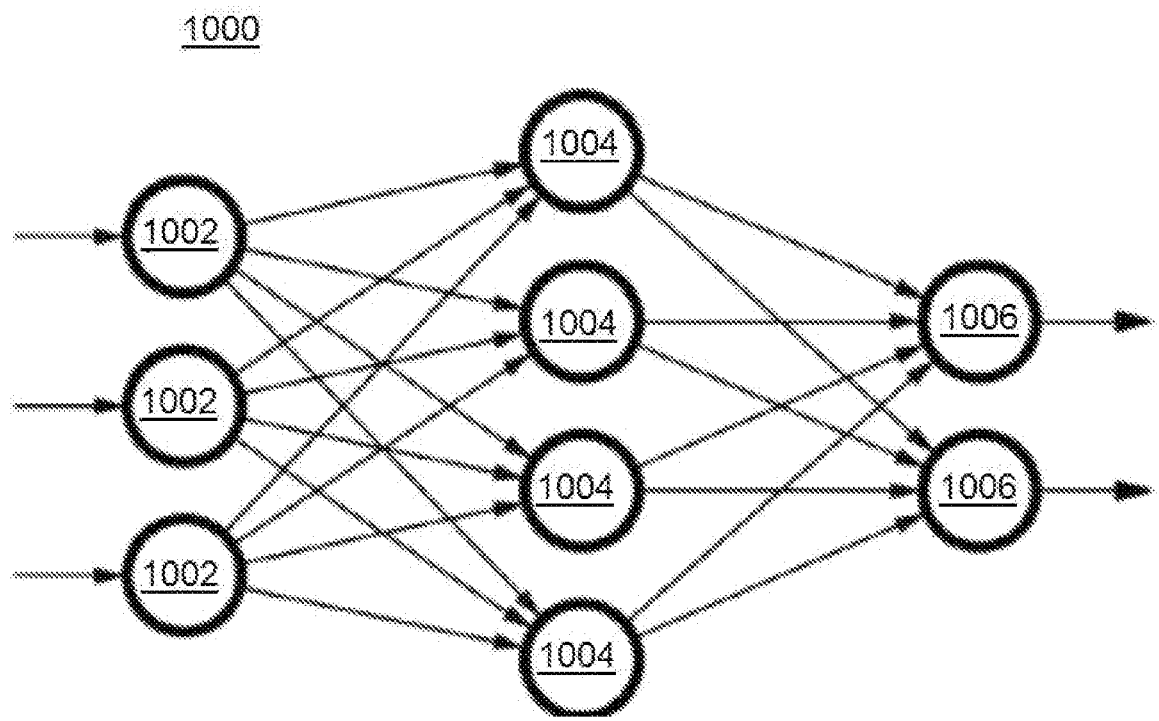
FIG. 6 is a schematic diagram of a neural network formed in "layers", according to an embodiment.

FIG. 6 is a schematic diagram of a neural network 1000 formed in "layers" in which an initial layer is formed by nodes 1002 and a final layer is formed by nodes 1006. All or a portion of features of NN 1000 may be implemented in aspects of systems 200, 300 or 400 such as, for example, NN 202 or NN 302, for example. Neural network (NN) 1000 may include an intermediate layer formed by nodes 1004. Edges shown between nodes 1002 and 1004 illustrate signal flow from an initial layer to an intermediate layer. Likewise, edges shown between nodes 1004 and 1006 illustrate signal flow from an intermediate layer to a final layer. While neural network 1000 shows a single intermediate layer formed by nodes 1004, it should be understood that other implementations of a neural network may include multiple intermediate layers formed between an initial layer and a final layer.

According to an embodiment, a node 1002, 1004 and/or 1006 may process input signals (e.g., received on one or more incoming edges) to provide output signals (e.g., on one or more outgoing edges) according to an activation function. An "activation function" as referred to herein means a set of one or more operations associated with a node of a neural network to map one or more input signals to one or more output signals. In a particular implementation, such an activation function may be defined based, at least in part, on a weight associated with a node of a neural network. Operations of an activation function to map one or more input signals to one or more output signals may comprise, for example, identity, binary step, logistic (e.g., sigmoid and/or soft step), hyperbolic tangent, rectified linear unit, Gaussian error linear unit, Softplus, exponential linear unit, scaled exponential linear unit, leaky rectified linear unit, parametric rectified linear unit, sigmoid linear unit, Swish, Mish, Gaussian and/or growing cosine unit operations. It should be understood, however, that these are merely examples of operations that may be applied to map input signals of a node to output signals in an activation function, and claimed subject matter is not limited in this respect. Additionally, an "activation input value" as referred to herein means a value provided as an input parameter and/or signal to an activation function defined and/or represented by a node in a neural network. Likewise, an "activation output value" as referred to herein means an output value provided by an activation function defined and/or represented by a node of a neural network. In a particular implementation, an activation output value may be computed and/or generated according to an activation function based on and/or responsive to one or more activation input values received at a node. In a particular implementation, an activation input value and/or activation output value may be structured, dimensioned and/or formatted as "tensors". Thus, in this context, an "activation input tensor" or "input tensor" as referred to herein means an expression of one or more activation input values according to a particular structure, dimension and/or format. Likewise in this context, an "activation output tensor" or "output tensor" as referred to herein means an expression of one or more activation output values according to a particular structure, dimension and/or format.

In particular implementations, neural networks may enable improved results in a wide range of tasks, including image recognition, speech recognition, just to provide a couple of example applications. To enable performing such tasks, features of a neural network (e.g., nodes, edges, weights, layers of nodes and edges) may be structured and/or configured to form "filters" that may have a measurable/numerical state such as a value of an output signal. Such a filter may comprise nodes and/or edges arranged in "paths" and are to be responsive to sensor observations provided as input signals. In an implementation, a state and/or output signal of such a filter may indicate and/or infer detection of a presence or absence of a feature in an input signal.

In particular implementations, intelligent computing devices to perform functions supported by neural networks may comprise a wide variety of stationary and/or mobile devices, such as, for example, automobile sensors, biochip transponders, heart monitoring implants, Internet of things (IOT) devices, kitchen appliances, locks or like fastening devices, solar panel arrays, home gateways, smart gauges, robots, financial trading platforms, smart telephones, cellular telephones, security cameras, wearable devices, thermostats, Global Positioning System (GPS) transceivers, personal digital assistants (PDAs), virtual assistants, laptop computers, personal entertainment systems, tablet personal computers (PCs), PCs, personal audio or video devices, personal navigation devices, just to provide a few examples.

According to an embodiment, a neural network may be structured in layers such that a node in a particular neural network layer may receive output signals from one or more nodes in an upstream layer in the neural network, and provide an output signal to one or more nodes in a downstream layer in the neural network. One specific class of layered neural networks may comprise a convolutional neural network (CNN) or space invariant artificial neural networks (SIANN) that enable deep learning. Such CNNs and/or SIANNs may be based, at least in part, on a shared-weight architecture of a convolution kernels that shift over input features and provide translation equivariant responses. Such CNNs and/or SIANNs may be applied to image and/or video recognition, recommender systems, image classification, image segmentation, medical image analysis, natural language processing, brain-computer interfaces, financial time series, just to provide a few examples.

Another class of layered neural network may comprise a recursive neural network (RNN) that is a class of neural networks in which connections between nodes form a directed cyclic graph along a temporal sequence. Such a temporal sequence may enable modeling of temporal dynamic behavior. In an implementation, an RNN may employ an internal state (e.g., memory) to process variable length sequences of inputs. This may be applied, for example, to tasks such as unsegmented, connected handwriting recognition or speech recognition, just to provide a few examples. In particular implementations, an RNN may emulate temporal behavior using finite impulse response (FIR) or infinite impulse response (IIR) structures. An RNN may include additional structures to control stored states of such FIR and IIR structures to be aged. Structures to control such stored states may include a network or graph that incorporates time delays and/or has feedback loops, such as in long short-term memory networks (LSTMs) and gated recurrent units.

According to an embodiment, output signals of one or more neural networks (e.g., taken individually or in combination) may at least in part, define a "predictor" to generate prediction values associated with some observable and/or measurable phenomenon and/or state. In an implementation, a neural network may be "trained" to provide a predictor that is capable of generating such prediction values based on input values (e.g., measurements and/or observations) optimized according to a loss function. For example, a training process may employ back propagation techniques to iteratively update neural network weights to be associated with nodes and/or edges of a neural network based, at least in part on "training sets." Such training sets may include training measurements and/or observations to be supplied as input values that are paired with "ground truth" observations. Based on a comparison of such ground truth observations and associated prediction values generated based on such input values in a training process, weights may be updated according to a loss function using backpropagation.

One particular embodiment is directed to an article comprising: a non-transitory storage medium comprising computer-readable instructions stored thereon that are executable by one or more processors of a computing device to express in one or more circuit devices: circuitry to obtain a temporal sequence of time instances, each time instance comprising one or more samples; for a current time instance in the temporal sequence of time instances: circuitry to compute a signal to be indicative of a rate of change in at least one value of the one or more samples of the current time instance; and circuitry to generate an accumulated difference value based on the computed signal and an accumulated difference value generated for a previous time instance in the temporal sequence of time instances; and circuitry to apply the accumulated difference value to correct at least one value of one or more samples in a selected time instance of the temporal sequence of time instances or an operation to be applied to the at least one value of one or more samples in the selected time instance of the temporal sequence of time instances. In a particular implementation, the temporal sequence of time instances comprises a temporal sequence of image frames, each image frame comprising one or more intensity values associated with spatially arranged locations in an image frame format; and the circuitry to compute the signal to be indicative of the rate of change in at least one value of the one or more samples of the current time instance comprises: circuitry to determine a greyscale value for at least one spatially arranged location in a current image frame of the temporal sequence of image frames based, at least in part, on image signal intensity values for multiple color channels associated with the at least one spatially arranged location over multiple image frames in the temporal sequence of image frames; and circuitry to accumulate the combined greyscale value over the multiple image frames. For example, the circuitry to accumulate the combined greyscale value over the multiple image frames may comprise: circuitry to warp a greyscale value of a previous image frame of the temporal sequency of image frames based, at least in part, on a motion vector to provide a warped greyscale value; and circuitry to combine the warped greyscale value with a greyscale value for image signal intensity values for a spatially arranged location in a rendered current image frame to provide the computed signal to be indicative of the rate of change. In another particular implementation, the temporal sequence of time instances comprises a temporal sequence of image frames; and the circuitry to apply the accumulated difference value further comprises: circuitry to determine an input tensor of a neural network based, at least in part, on the accumulated difference value; and circuitry to apply coefficients to image signal intensity values of a warped history of the temporal sequence of frames to provide an output image frame, the coefficients to be determined based, at least in part, on an output tensor of the neural network.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A computer-implemented method comprising:
   receiving a temporal sequence of time instances, each time instance comprising one or more samples; and
   for a current time instance in the temporal sequence of time instances:
      computing a signal that is indicative of a rate of change in at least one value of one or more samples of the current time instance;
      generating an accumulated difference value based on the computed signal and an accumulated difference value generated for a previous time instance in the temporal sequence of time instances; and
      applying the accumulated difference value to correct at least one value of one or more samples in a selected time instance of the temporal sequence of time instances or an operation to be applied to the at least one value of one or more samples in the selected time instance of the temporal sequence of time instances.

2. The method of claim 1, wherein:
   the temporal sequence of time instances comprises a temporal sequence of image frames, each image frame comprising one or more intensity values associated with spatially arranged locations in an image frame format; and
   computing the signal to be indicative of the rate of change in at least one value of the one or more samples of the current time instance comprises:
   determining a greyscale value for at least one spatially arranged location in a current image frame of the temporal sequence of image frames based, at least in part, on image signal intensity values for multiple color channels associated with the at least one spatially arranged location over multiple image frames in the temporal sequence of image frames; and
   determining a greyscale derivative value based, at least in part, on an absolute difference between a greyscale value for the current time instance, and a greyscale value from the previous time instance; and
   accumulating the greyscale derivative value over the multiple image frames.

3. The method of claim 2, wherein accumulating the greyscale derivative value over the multiple image frames comprises:
   warping a greyscale value of a previous image frame of the temporal sequency of image frames based, at least in part, on a motion vector to provide a warped greyscale value; and
   combining the warped greyscale value with a greyscale value for image signal intensity values for a spatially arranged location in a rendered current image frame to provide the computed signal indicative of the rate of change.

4. The method of claim 1, wherein the computed signal that is indicative of the rate of change comprises a combined greyscale value.

5. The method of claim 2, wherein computing the signal to be indicative the rate of change in the at least one of the one or more samples of the current time instance comprises:
   warping a greyscale value of a previous image frame based, at least in part, on a motion vector to provide a warped greyscale value;
   combining the warped greyscale value with a greyscale value for image signal intensity values for a spatially arranged location in a rendered current frame to provide a combined greyscale value; and
   combining the combined greyscale value with an accumulated greyscale value computed for the previous image frame to provide the computed signal.

6. The method of claim 1, wherein:
   the temporal sequence of time instances comprises a temporal sequence of image frames; and
   applying the accumulated difference value further comprises:
   selectively applying an anti-flicker processing to image signal intensity values of at least a portion of pixel locations in at least one frame image frame in the temporal sequence of image frames.

7. The method of claim 1, wherein:
   the temporal sequence of time instances comprises a temporal sequence of image frames; and
   applying the accumulated difference value further comprises:
   determining an input tensor of a neural network based, at least in part, on the accumulated difference value; and
   applying coefficients to image signal intensity values of a warped history of the temporal sequence of frames to provide an output image frame, the coefficients to be determined based, at least in part, on an output tensor of the neural network.

8. A computing device comprising:
   one or more memory devices; and
   one or more processors coupled to the one or more memory devices to:
   obtain a temporal sequence of time instances, each time instance comprising one or more samples; and
   for a current time instance in the temporal sequence of time instances:
   compute a signal to be indicative of a rate of change in at least one value of one or more samples of the current time instance;
   generate an accumulated difference value based on the computed signal and an accumulated difference value generated for a previous time instance in the temporal sequence of time instances; and
   apply the accumulated difference value to correct at least one value of one or more samples in a selected time instance of the temporal sequence of time instances or an operation to be applied to the at least one value of the one or more samples in the selected time instance of the temporal sequence of time instances.

9. The computing device of claim 8, wherein:
   the temporal sequence of time instances comprises a temporal sequence of image frames, each image frame comprising one or more intensity values associated with spatially arranged locations in an image frame format; and
   the one or more processors are further to:
   determine a greyscale value for at least one spatially arranged location in a current image frame of the temporal sequence of image frames based, at least in part, on image signal intensity values for multiple color channels associated with the at least one spatially arranged location over multiple image frames in the temporal sequence of image frames;

combine the greyscale value for the at least one spatially arranged location in the current image frame with a greyscale value for image signal intensity values for a spatially arranged location in a rendered previous image frame to provide a combined greyscale value; and compute the signal to be indicative of the rate of change in at least one value of the one or more samples of the current time instance based, at least in part, on:

an accumulation of combined greyscale values over the multiple image frames.

10. The computing device of claim 9, wherein the one or more processors are further to:

warp the greyscale value for image signal intensity values for the spatially arranged location in the rendered previous image frame based, at least in part, on a motion vector to provide a warped greyscale value; and combine the warped greyscale value with the greyscale value for the at least one spatially arranged location in the current image frame to provide the computed signal to be indicative of the rate of change.

11. The computing device of claim 8, wherein the computed signal to be indicative of the rate of change comprises a combined greyscale value.

12. The computing device of claim 9, wherein the one or more processors are further to:

warp a greyscale value of a previous image frame based, at least in part, on a motion vector to provide a warped greyscale value;

combine the warped greyscale value with a greyscale value for image signal intensity values for a spatially arranged location in a rendered current frame to provide a combined greyscale value; and combine the combined greyscale value with an accumulated greyscale value computed for the previous image frame to provide the computed signal to be indicative of the rate of change.

13. The computing device of claim 8, wherein:

the temporal sequence of time instances comprises a temporal sequence of image frames; and the one or more processors are further to selectively apply an anti-flicker processing to image signal intensity values of at least a portion of pixel locations in at least one frame image frame in the temporal sequence of image frames.

14. The computing device of claim 8, wherein:

the temporal sequence of time instances comprises a temporal sequence of image frames; and the one or more processors are further to:

determine an input tensor of a neural network based, at least in part, on the accumulated difference value; and applying coefficients to image signal intensity values of a warped history of the temporal sequence of frames to provide an output image frame, the coefficients to be determined based, at least in part, on an output tensor of the neural network.

15. An article comprising:

a non-transitory storage medium comprising computer-readable instructions stored thereon, the computer-readable instructions to be executable by one or more processors to:

obtain a temporal sequence of time instances, each time instance comprising one or more samples; and for a current time instance in the temporal sequence of time instances:

compute a signal to be indicative of a rate of change in at least one value of one or more samples of the current time instance in the at least one value; and generate an accumulated difference value based on the computed signal and an accumulated difference value generated for a previous time instance in the temporal sequence of time instances; and apply the accumulated difference value to correct at least one value of one or more samples in a selected time instance of the temporal sequence of time instances or an operation to be applied to the at least one value of the one or more samples in the selected time instance of the temporal sequence of time instances.

16. The article of claim 15, wherein:

the temporal sequence of time instances comprises a temporal sequence of image frames, each image frame comprising one or more intensity values associated with spatially arranged locations in an image frame format; and the instructions to be further executable by the one or more processors to:

determine a greyscale value for at least one spatially arranged location in a current image frame of the temporal sequence of image frames based, at least in part, on image signal intensity values for multiple color channels associated with the at least one spatially arranged location over multiple image frames in the temporal sequence of image frames;

combine the greyscale value with a greyscale value for image signal intensity values for a spatially arranged location in a rendered previous image frame to provide a combined greyscale value; and compute the signal to be indicative of the rate of change in at least one value of the one or more samples of the current time instance based, at least in part, on:

an accumulation of combined greyscale values over the multiple image frames.

17. The article of claim 16, wherein the instructions to be further executable by the one or more processors to:

warp the greyscale value for image signal intensity values for the spatially arranged location in the rendered previous image frame based, at least in part, on a motion vector to provide a warped greyscale value; and combine the warped greyscale value with the greyscale value for the at least one spatially arranged location in the current image frame to provide the computed signal to be indicative of the rate of change.

18. The article of claim 15, wherein the computed signal to be indicative of the rate of change comprises a combined greyscale value.

19. The article of claim 15, wherein the instructions to be further executable by the one or more processors to:

warp a greyscale value of a previous image frame based, at least in part, on a motion vector to provide a warped greyscale value;

combine the warped greyscale value with a greyscale value for image signal intensity values for a spatially arranged location in a rendered current frame to provide a combined greyscale value; and combine the combined greyscale value with an accumulated greyscale computed for the previous image frame to provide the computed signal to be indicative of the rate of change.

20. The article of claim 15, wherein:

the temporal sequence of time instances comprises a temporal sequence of image frames; and the instructions to be further executable by the one or more processors to selectively apply an anti-flicker processing to image signal intensity values of at least a portion of spatially arranged locations in at least one frame image frame in the temporal sequence of image frames based, at least in part, on the accumulated difference value.

\* \* \* \* \*